United States Patent
McHale et al.

(10) Patent No.: US 8,775,731 B2
(45) Date of Patent: Jul. 8, 2014

(54) WRITE SPIKE PERFORMANCE ENHANCEMENT IN HYBRID STORAGE SYSTEMS

(75) Inventors: Gregory McHale, Brookline, NH (US);
Brian G. Nadeau, Nashua, NH (US);
Bryan K. Panner, Windham, NH (US);
Peter J. Hunter, Amherst, NH (US);
Damon Hung, Providence, RI (US);
Janice Lacy, Temple, NH (US)

(73) Assignee: Dell Products, L.P., Round Rock, TX (US)

( * ) Notice: Subject to any disclaimer, the term of this patent is extended or adjusted under 35 U.S.C. 154(b) by 619 days.

(21) Appl. No.: 13/071,557

(22) Filed: Mar. 25, 2011
(Under 37 CFR 1.47)

(65) Prior Publication Data

US 2012/0246403 A1 Sep. 27, 2012

(51) Int. Cl.
*G06F 13/00* (2006.01)

(52) U.S. Cl.
USPC ............................ 711/114; 711/103; 711/165

(58) Field of Classification Search
CPC . G06F 12/02; G06F 12/0238; G06F 12/0246; G06F 3/0605; G06F 3/067; G06F 3/0631; G06F 3/0653
USPC .......... 711/103, 112, 114, 115, 165, E12.001, 711/E12.002; 365/185.33
See application file for complete search history.

(56) References Cited

U.S. PATENT DOCUMENTS

| | | | |
|---|---|---|---|
| 5,274,799 A | 12/1993 | Brant et al. | |
| 7,617,359 B2 | 11/2009 | Sutardja et al. | |
| 8,345,489 B2 * | 1/2013 | Montgomery et al. | .. 365/189.04 |
| 8,407,403 B2 * | 3/2013 | Prabhakaran et al. | ........ 711/103 |
| 2008/0263281 A1 * | 10/2008 | Kim et al. | ..................... 711/122 |
| 2008/0307192 A1 | 12/2008 | Sinclair et al. | |
| 2010/0199036 A1 * | 8/2010 | Siewert et al. | ................ 711/112 |
| 2010/0257301 A1 | 10/2010 | Kloeppner et al. | |
| 2011/0252210 A1 * | 10/2011 | Davies | .......................... 711/165 |

OTHER PUBLICATIONS

Narayanan, D., et al., "Migrating Server Storage to SSDs: Analysis of Tradeoffs," *EuroSys'* 09, (Apr. 1-3, 2009).
"High-Performance Hybrid Arrays (HPHAs)," *HPHA Brief*, printed in U.S.A.:( Sep. 2009).

(Continued)

*Primary Examiner* — Sanjiv Shah
*Assistant Examiner* — Zhuo Li
(74) *Attorney, Agent, or Firm* — Hamilton, Brook, Smith & Reynolds, P.C.

(57) ABSTRACT

A hybrid storage array one using two or more storage device tiers. In one implementation, two tiers may be provided by solid state drives (SSDs) and hard disk drives (HDDs). Host application access patterns of a certain type determined to be relatively slow, such as random writes, are detected. The random writes are collected and written to a special reserve space, such as a portion of the SSD storage tier, referred to as a write cache extension. The write cache extension absorbs such accesses that would otherwise be written to HDD storage directly. Data structures are created in a cache memory local to an array controller representing the location on SSD reserve space to which the writes were committed and a location in the storage system where they were originally intended to go. The write cache extension can be enabled all of the time, or only when the array controller write cache experiences certain operating conditions, such as when its utilization exceeds a certain predetermined amount. The approach improves the overall performance of the hybrid array.

26 Claims, 3 Drawing Sheets

(56) References Cited

OTHER PUBLICATIONS

"Rethink Storage With Sun™ Storage 7000 Systems," *Sun Microsystems, Inc.*, (on the Web sun.com, pp. 1-12 (2008).
"Adaptec—Adaptec MaxIQ™ Storage Controllers," *adaptec by PMC*, http://www.adaptec.com/en-us/_common/maxiq_controllers/ (Oct. 6, 2010).
Schmid, P. and Roos, A., "MaxIQ Details," *Tom's Hardware: Review maxiq ssd cache*, (Feb. 12, 2010).
Schmid, P. and Roos, A., "Adaptec Storage Manager and MaxIQ," *Tom's Hardware: Review maxiq ssd cache*, (Feb. 12, 2010).
"Storage area network," *Wikipedia, the free encyclopedia*, http://en.wikipedia.org/wiki/Storage_area_network, pp. 1-5 (Nov. 15, 2010).
"File: Compingles.GIF," *Wikipedia, the free encyclopedia*, http://en.wikipedia.org/wiki/File:CompinglesGIF, pp. 1-3 (Nov. 15, 2010).

* cited by examiner

WRITE SPIKE PERFORMANCE ENHANCEMENT IN HYBRID STORAGE SYSTEMS

BACKGROUND

1. Field of the Disclosure

This disclosure relates generally to information handling systems and devices, and more particularly to hybrid storage arrays.

2. Description of the Related Art

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. These variations allow information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

One type of information handling system is a storage array. A storage array typically includes multiple disk drives or similar persistent, inexpensive storage units. A storage array can allow large amounts of data to be stored in an efficient manner while providing redundancy to promote reliability such as Redundant Array of Inexpensive Disks (RAID) functionality.

In addition to the disk drives or other persistent storage units, a storage array commonly also includes one or more array controllers (typically taking the physical form of one or more integrated circuits or circuit boards), and interface circuits to connect the storage array to an external host. The host may be a personal computer, a network server or some other information handling system. The controller includes one or more processors or similar hardwired logic that causes the storage array to read or write data to or from its persistent storage in response to requests received from the host. The controller also commonly includes memory that acts as a buffer or temporary storage for data being transferred to and from persistent storage.

Hybrid-based storage solutions combine multiple storage technologies, such as Solid State Drives (SSDs) and Hard Disk Drives (HDDs) in the same storage array. Hybrid storage arrays are a particularly attractive solution for large volume applications such as data centers and cloud computing where high performance and low cost are each of importance. These high performance hybrid arrays can combine intelligent caching software with low cost HDDs (such as Serial ATA (SATA) drives or faster Small Computer System Interface (SCSI) drives), and/or high-performance energy-efficient SSDs. The hybrid approach combines the scalability and relative affordability of HDD technology with the low-latency I/O performance and energy efficiency of SSDs.

Hybrid storage arrays are typically managed by a cache-pool-aware storage controller which uses various techniques to determine how to most efficiently provision the data between the HDD and SSD devices. For example, write data blocks may be addressed by an application software program to a primary rotating medium such as the HDDs. Intelligent SSD caching software analyzes patterns in these application I/O requests and builds access tables. The caching software uses these access tables to move the more frequently accessed data blocks from the HDD to the SSD tier so that faster retrieval is possible during future requests for the same data blocks. The intelligent caching software can also transparently execute writes directly to the low latency SSD media so that high frequency writes can be quickly acknowledged back to the application. Data written this way to the SDDs is then pushed as a background task to the HDDs when access to it becomes less frequent.

In addition, these hybrid storage arrays can also provide other services such as RAID, load balancing, encryption, and management functions while further isolating the application from the underlying hardware.

SUMMARY OF THE DISCLOSURE

Existing hybrid storage solutions can thus be used to deliver improved performance. However, these solutions become less advantageous when an application enters particular modes. Such modes occur, for example, when an application decides to flush a significant quantity of data to a storage array. Because of the nature of parity RAID schemes, every write to the storage array, if sufficiently small and random in nature, requires multiple writes and multiple reads to complete a RAID access. If the storage array performance is already borderline sufficient, it may become insufficient as soon as these "write spikes" hit.

The present disclosure provides a solution that includes a unique approach to write acceleration in hybrid storage arrays. The approach prevents write spikes from ever hitting the slower HDD drives that the applications are similarly trying to read, and therefore stops those spikes from adversely affecting application performance.

In an approach which incorporates the inventive solution herein, the SSDs are assigned as a "tier-zero" level storage, and the HDDs as "tier-one" level storage. The array software determines which pages should reside on the SSD tier and which pages should reside on the HDD tier by measuring the frequency of read and/or write requests to them over time. The pages are preferably organized into "frequency zones" represented as "very hot", "hot", "warm" and "cold". Very hot pages are accessed so frequently that they are cached in a memory that is local to the storage controller. Hot pages are migrated to the SSD tier from the storage controller cache memory when space is available, or are traded to the SSD tier in exchange for cold pages. In the absence of hot pages, warm pages can be migrated to the SSD tier or traded for cold pages by the same rules.

In accordance with the preferred embodiment, a portion of the SSD tier is also reserved for a special function, called a write cache extension. A mechanism is provided such that random writes that were initially intended to be written to the HDD tier are first collected in the write cache extension portion. They then are written sequentially from the write cache extension to the SSD tier at a later time, such as when the number of random writes collected is near a RAID stripe size.

Metadata is also preferably recorded in the write cache extension that indicates the original logical block addresses (LBAs) for which the writes were targeted The mechanism can be selectively enabled only when needed, such as when the array controller write cache exceeds a predetermined utilization, such as 70%. When this condition is met, the acceleration mechanism is enabled and begins absorbing any random writes that would otherwise be written to the HDD/SDD tiers directly.

As a result, a comprehensive and unique solution is provided with the controller software automatically 1) migrating data between the controller cache, tier-zero and tier-one storage, as well as 2) using a reserve portion of the tier-zero storage to absorb application write spikes.

In one particular arrangement, a storage array apparatus provides a tier-zero storage portion to which preferably a first relatively fast storage scheme is applied, a tier-one storage portion, to which a second relatively slow storage scheme is applied, and a storage cache portion. A write cache extension portion preferably resides in the tier-zero portion or other portion with relatively fast device access time.

A storage array controller manages access to the storage cache, tier-zero and tier-one portions by migrating data between them, based on a measured demand for specific data pages. The storage array controller also detects particular types or particular patterns of storage commands (such as requests for small randomly ordered writes) to the tier-one storage portion. If the storage command falls into such a pattern, the storage controller then determines if the storage cache is experiencing some other condition, such as if it is already full by more than a predetermined amount. If the other condition is met, the storage controller then stores data associated with the storage command in the write cache extension portion.

The storage controller also operates to migrate data from the write cache extension portion to the tier-one storage portion. As one example in a case where the detected storage pattern is random writes, this may occur only after a predetermined number of the random writes have been stored in the write cache portion.

In yet other aspects, data may be transferred from the write cache extension only when number of random writes it has stored is near or at a full RAID stripe size as used by the tier-one storage.

In further aspects, the storage array may store metadata associated with the storage command patterns. As one example, in a case where the detected storage pattern is random writes, the metadata preferably indicates the logical block addresses for which the random write(s) are eventually intended. This metadata can also be stored temporarily in the write cache extension portion.

The storage array controller may migrate pages between the various tiers by measuring the frequency of RAID requests, such as by organizing pages of the array into multiple frequency zones. In one example embodiment, these frequency zones may represented as very hot, hot, and cold. Very hot pages are cached in storage cache main portion. Hot pages are migrated to the tier-zero portion when space is available or are traded to the tier-zero portion in exchange for cold pages in the tier-one portion. The frequency zones may further include a warm frequency zone whereby, in the absence of hot pages, warm pages are migrated to the tier-zero portion in exchange for cold pages in the tier-one portion.

In typical implementations, the tier-one portion may be one or more hard disks drives and tier-zero portion may be one or more solid state drives. However, other hybrid solutions using different storage technologies are possible, mixing various levels of performance and costs of solid state, magnetic disk, optical, and/or other media types.

In a further aspect, the storage controller may be implemented as software code executing on a programmable data processor, as hardwired logic, in programmable gate arrays, or any other known means for implementing the logic of data processing operations.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF AN EMBODIMENT

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
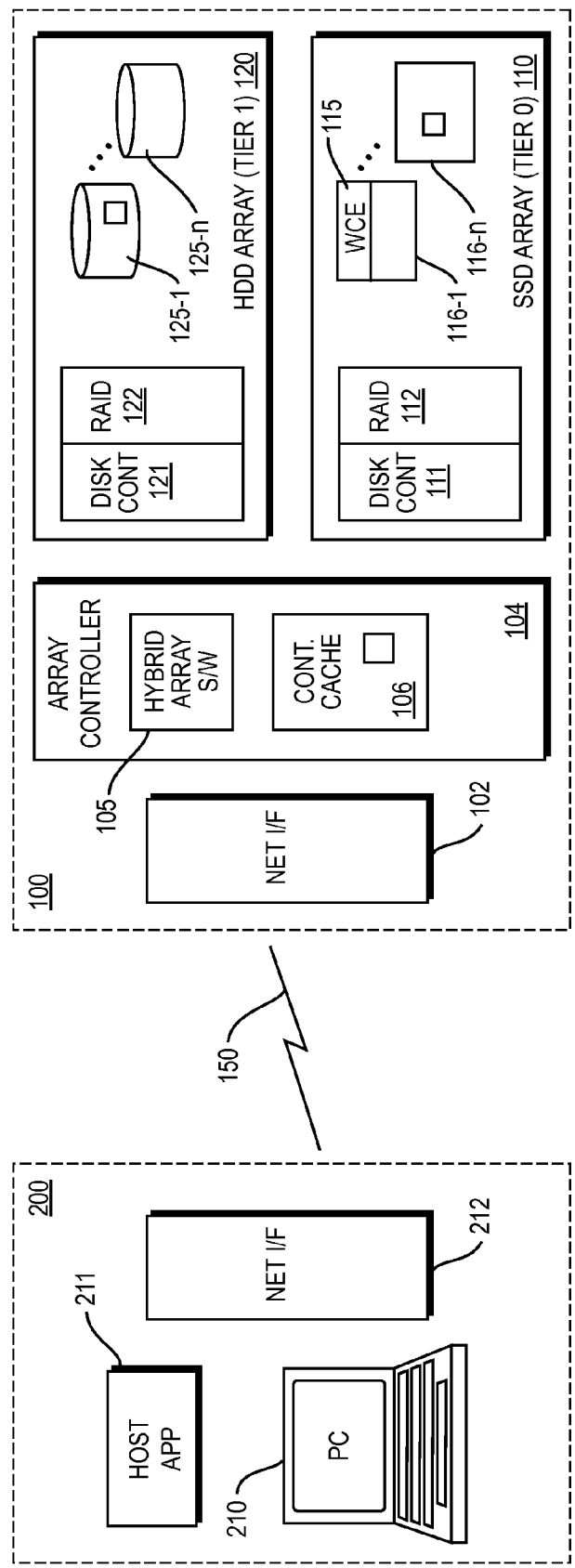
FIG. 1 is a high level diagram of a hybrid storage array.

FIG. 1 shows an information handling system that implements a hybrid storage array 100 as one embodiment more fully described below. In the typical environment, the storage array 100 provides a data storage function to a host computer 200. Host 200 may, as one example, be a personal computer 210 that executes application software 211, although other types of hosts 200 such as web servers, database engines, or other computers may also use the array 100 to store data. In FIG. 1 a network interface 212 is used by the host 200 to send commands and data to and from the storage array 100, such as via a computer network connection 150 such as the Internet, private networks, or other networks. However, other types of connections between host 200 and array 100 are possible.

The storage array 100 includes a corresponding interface 102 enabling it to communicate with the host 200, an array controller 104, and at least two different tiers of storage devices, including tier-zero 110 and tier-one 120 portions. In the specific embodiment illustrated, the tier-zero portion 110 is provided by physical storage devices having a relatively fast device access time, such as a Solid State Drive (SSD) array wherein the data storage devices are solid state integrated circuits 116. The integrated circuits may be non-volatile flash or other semiconductor memory technologies. SSD arrays provide extremely fast performance to store persistent data.

The tier-one portion 120 may be provided by physical storage devices that have a somewhat slower device access time that the tier-zero portion. The tier-1 portion may be provided, for example, by a Hard Disk Drive (HDD) array consisting of one or more electromagnetic spinning disk type devices 125 with movable read-write heads. Compared to HDDs, SSDs are typically less susceptible to physical shock, are quieter, and have much faster access time and latency. However, HDDs are typically much less expensive on a per-byte basis. Most SSDs use NAND-based flash semiconductors which can retain memory even without power. However, other solutions using volatile Random Access Memory (RAM) technologies can also be used for situations where even faster performance is desired but where data persistence after power loss is needed or where batteries can be used.

As shown, the tier-zero portion or SSD array 110 has its own disk controller 111 and optional RAID logic 112 functionality. Functions of the SSD array 110 may be provided by a large number of SSD drives 116-1, . . . , 116-n. Most of the SSD array is allocated to a main storage function, but in a preferred embodiment, a portion of the SSD array 110 is reserved as a write cache extension (WCE) 115 whose purpose will become more evident in the discussion below. In other embodiments, the WCE may be located elsewhere in other "tiers", but still implemented using devices having a device access time that is faster than the tier-one portion.

The tier-one portion or HDD array 120 similarly has its own disk controller 121 and optional RAID logic portion 122. The tier-one portion can be provided by a number of individual HDD disk drives, 125-1, . . . , 125-n.

The hybrid array controller 104 coordinates access to and between the tier-zero 110, tier-one 120 and a high-speed semiconductor memory used as a local controller cache memory 106. These functions are typically implemented as hybrid array software 105 but can also be implemented in gate arrays or hardwired circuits.

It should be understood that in certain embodiments, there may be more than two tiers in the hybrid array 100, and that data may be managed between the multiple tiers analogous to the manner described herein for two tiers.

It should also be understood that the functions of controllers 111 and/or 121 may be implemented inside the hybrid array controller 104.

Figure 2:
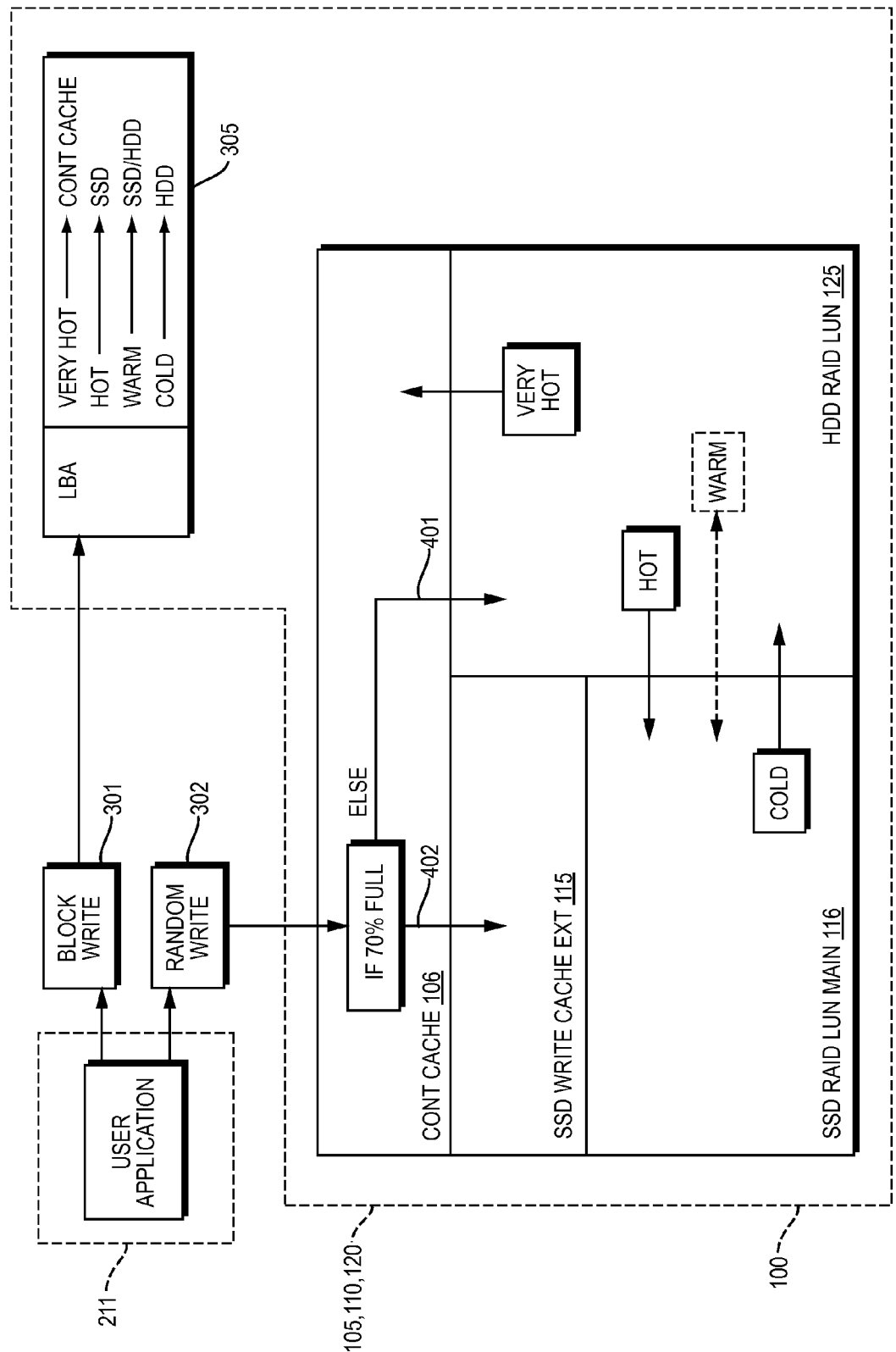
FIG. 2 is a high level flow diagram illustrating how very hot, hot, warm and cold pages are migrated between various storage tiers.

FIG. 2 depicts the logical flow between a host application 211, the hybrid array software 105 and various components of the tier-zero 110 and tier-one 120 storage including the write cache extension 115. At a high level, the host application 211 may issue two general types of host application access patterns to the storage array 100.

One type of host application access pattern is a random access pattern, where the locations to be written are in a relatively random sequence. Such patterns exist when one or more storage commands result in access to the storage array that are not sequential and/or access a relatively small amount of data, that is, somewhat less than a full RAID stripe.

A second type of host application access pattern is a "bulk" write operation 301 where a relatively large number of contiguous memory locations are to be written. This may occur such as when an amount of data equal to or greater than a RAID stripe size is to be written.

It should be understood that other predetermined types of host access patterns to be detected may be predefined, and ranked according to their relative performance. Relative performance may depend on certain attributes of the access patterns, such as their typical speed of completion.

If the operation is of the first type, where a relatively large amount of contiguous data is to be written, then the hybrid array software 105 keeps an access frequency table 305 to help manage where the data will be stored as follows. Pages in the array may be arranged, in say, four different frequency zones represented as very hot, hot, warm and cold. By frequency "zones", it is meant that the controller 105 determines the relative demand for access to particular pages as compared to other pages. As one example, very hot pages are accessed so frequently that they are cached in the storage controller cache memory 106. Hot pages are moved to the SSD (tier-zero) 110 from the cache 106 when space is available. Cold pages are migrated to the HDD (tier-one) 120. Hot pages may also be traded to the SSD tier 110 in exchange for cold pages. In the absence of many hot pages, warm pages can be migrated to the SSD tier 120 or traded for cold pages by the same rules.

In addition, a background process running in the write controller software 105 generally migrates pages and updates table 305 based upon demand frequency. For example, very hot pages are migrated to the controller cache 106, hot pages are migrated from the HDD tier 120 to the SSD tier 110, and cold pages are migrated from the SSD tier 110 to the HDD tier 120. Warm pages may be migrated back and forth between the SSD 110 and HDD 120 tiers depending upon demand for those as well.

As mentioned briefly above, an additional portion of the SSD tier 110 (or other tier) is reserved as a write cache extension (WCE) 115. The write cache extension portion 115 is used in a situation where the host application 211 is requesting the first type of write operation, such as random writes. In this instance, the small, random writes that would otherwise be written to the HDD tier 120 as cold pages are first written to the reserved space in the write cache extension 115. Also preferably written are the original logical block addresses (LBAs) for which the random writes were originally targeted. This LBA information will be needed when the write cache extension 115 is later flushed to its destination in the HDD tier 120.

The SSD write cache extension 115 may not be utilized in all instances. For example, it may not be utilized when the controller cache 106 itself is not all that busy. This may occur when the array controller cache 106 contains less than a certain amount of data. In this instance, the random writes may be written to the HDD tier 120 directly (as indicated by arrow 401). However, if the array controller cache 106 utilization is greater than a certain amount (such as 70% as indicated by arrow 402), the write cache extension 115 may be enabled and begin absorbing these random writes that would otherwise be intended to be written directly to HDD tier 120 storage directly.

Once the contents of the write cache extension reach a certain size, such as at or near a RAID stripe size, they can be moved to the HDD tier 120.

Figure 3:
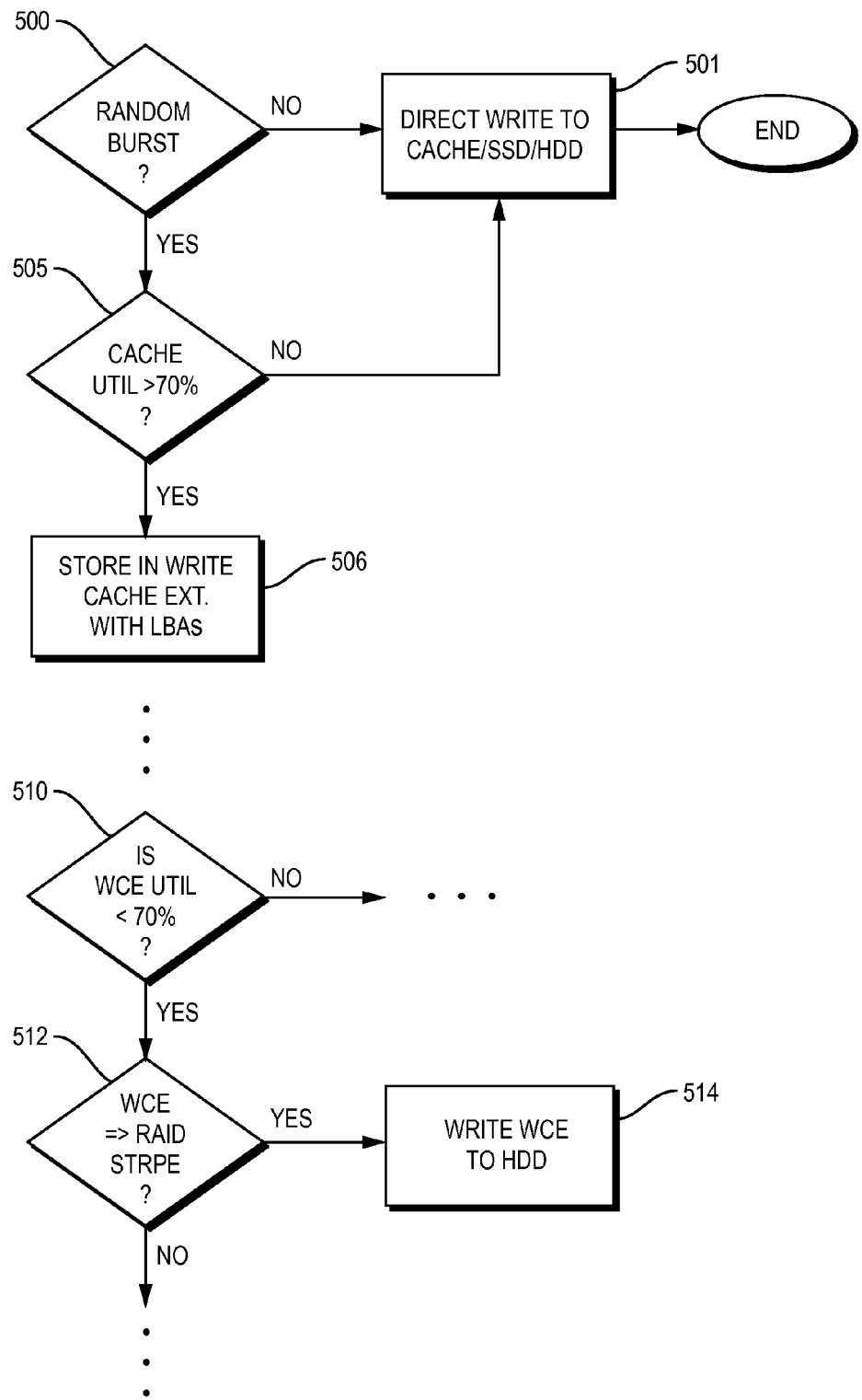
FIG. 3 shows the general logic for making decisions about migrating data blocks.

FIG. 3 is a flow diagram illustrating this in more detail. In a first state 500, if an incoming write operation is not of the first access type, e.g., it is not a random burst, then processing proceeds to state 501. This may be the case, for example, when the access is a block access. In state 501, a direct write is then made to either the controller cache 106, the SSD tier 110 or the HDD tier 120, depending upon whether the table 305 indicates the page being written to is very hot, hot or cold.

If in state 500 the access is determined to be a random burst, then state 505 is entered in which a predetermined condition of the array cache is detected. Such a condition may, for example, be whether utilization of the array cache 106 is less than the predetermined amount of say 70%. If this condition is met, then processing returns to state 501 where direct writes to the appropriate tier are enabled.

If, however, in state 505, the controller cache 106 is already storing greater than the predetermined amount of data, then processing moves forward to state 506 where the random burst will be stored in the write cache extension 115 along with the logical block addresses.

Another optional process, indicated as starting at state 510, periodically determines whether the write cache extension 115 is experiencing a certain condition, such as its utilization being less than 70%. If this is not the case, then nothing is done. However, if the write cache extension is being utilized to more than 70% of its capacity, then a state 512 is entered in which a test is made to determine whether the write cache extension 115 has stored more than a RAID stripe size. If not, then nothing occurs. If it has, then the write cache extension 115 contents are written to the HDD tier in state 514.

It should now be understood that an information handling system and method implemented according to principles, described herein, will have multiple tiers of storage, including at least a tier-zero portion and a tier-one portion. A storage array controller migrates pages between the various tiers based on measured demand for a specific page's access as, for example, in a background process. If the storage command is detected as a first type of relatively slow application access pattern, such as a request for a relatively random write access, then under certain conditions in the storage cache, data associated with the random write access is first stored in a write cache extension portion. The controller then transfers data from the write cache extension portion to other tiers only after other conditions are met, such as if a number of random writes have first been accumulated.

The write cache extension mode may be enabled all of the time, or alternatively, only when the main portion of a storage cache is utilized by more than a certain predetermined amount.

In addition, data may be transferred from the write cache extension portion only when the stored number of writes is at or near a RAID stripe size. This helps with efficiency of writes to the tier-one.

Migration on demand between the various tiers can be based upon a frequency of read requests from external applications such as running on a remote host.

Metadata associated with the random writes can indicate a logical block address for which the random writes are ultimately intended. This information is also stored in the write cache extension with the data itself.

The various storage tiers may be provided by hard disk drives, solid state drives or by other data storage technologies.

It is also to be understood that this disclosure is not limited to the particular apparatus, systems and methods described above, and as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "an element" refers to one or several elements and reference to "a method of providing" includes reference to equivalent steps and methods known to those skilled in the art, and so forth.

While this invention has been particularly shown and described with references to example embodiments thereof, it will be understood by those skilled in the art that various changes in form and details may be made therein without departing from the scope of the invention encompassed by the appended claims.

What is claimed is:

1. An information handling apparatus comprising:
a tier-0 storage portion;
a tier-1 storage portion having a device access time that is slower than a device access time of the tier-0 storage portion;
a write cache extension portion having a device access time that is faster than a device access time of the tier-1 storage portion;
a storage cache main portion; and
a storage array controller that:
receives a storage command for access to a page of data;
assigns one of a plurality of frequency zones of read and/or write requests to the page of data;
if the page is in a higher frequency zone, cache the data in the storage cache main portion;
if the page is in a middle frequency zone, migrate the page to the tier-0 storage portion;
detects if the storage command is one of a series of random writes to the tier-1 storage portion, and if so, sequentially write the series of random writes to a block of the write cache extension portion, and subsequently write the block to the tier-1 storage portion when the block has reached a particular size.

2. The apparatus of claim 1 wherein the write cache extension is part of the tier-0 portion.

3. The apparatus of claim 1 wherein the storage controller further stores meta-data associated with each random write indicating an address in the tier-1 storage portion intended for the random write.

4. The apparatus of claim 1 wherein the storage array is configured to migrate, cache, and detect the storage command if an amount of data stored in the storage cache main portion exceeds a predetermined amount.

5. The apparatus of claim 1 wherein data is transferred from the write cache extension portion to the tier-1 portion after the amount of data stored via the first accesses pattern is more than a predetermined amount.

6. The apparatus of claim 1 wherein assigning one of a plurality of frequency zones is based on a frequency of read requests from a host application.

7. The apparatus of claim 1 wherein the storage array sequentially writes the random writes to a block of the write cache extension portion if the series of random writes is less than a RAID stripe size used by the tier-1 storage portion.

8. The apparatus of claim 1 wherein the tier-1 storage portion comprises one or more hard disk drives (HDDs).

9. The apparatus of claim 1 wherein the tier-0 storage portion comprises one or more solid state drives (SDDs).

10. The apparatus of claim 1 wherein the storage array controller migrates pages of data between the tier-0, tier-1 and storage cache portion by measuring a frequency of access requests, with the pages organized into a number of different frequency zones, such that pages belonging to a particular frequency zone are preferentially stored in a particular one of the tier-0 portion, tier-1 portion, or the main storage cache portion.

11. The apparatus of claim 10 wherein the frequency zones include at least hot frequency zone and a cold frequency zone, and the storage array controller further migrates hot pages to the tier-0 portion in exchange for relatively cold pages, and such cold pages are migrated to the tier-1 portion.

12. The apparatus of claim 11 wherein the frequency zones further include a warm frequency zone, and in the absence of hot pages, the storage array migrates warm pages to the tier-1 portion by exchanging warm pages in the tier-1 portion with cold pages in the tier-0 portion.

13. The apparatus of claim 1 wherein the storage array controller is implemented as software code executing on a programmable data processor.

14. A method for handling information comprising:
receiving a storage command for access to a page of data of a storage array, the storage array having a tier-0 storage portion, a tier-1 storage portion, a storage cache main portion and a write cache extension portion, wherein a device access time of the tier-1 storage portion is slower than a device access time of the tier-1 portion, and where a device access time of the write cache extension portion is faster than the device access time of the tier-1 portion;
assigning one of a plurality of frequency zones of read and/or write requests to the page of data;
if the page is in a higher frequency zone, caching the data in the storage cache main portion;
if the page is in a middle frequency zone, migrate the page to the tier-0 storage portion;
determining if a storage command is one of a series of random writes to the tier-1 storage portion, and if so, sequentially write the series of random writes to a block of the write cache extension portion, and subsequently write the block to the tier-1 storage when the block has reached a particular size.

15. The method of claim 14 wherein the write cache extension portion is part of the tier-0 portion.

16. The method of claim 14 additionally comprising:
storing metadata associated with each random write indicating an address in the tier-1 storage portion intended for the random writes.

17. The method of claim 14 wherein the storage array is configured to migrate, cache, and detect the storage command if an amount of data stored in the storage cache main portion exceeds a predetermined amount.

18. The method of claim 14 wherein data is transferred from the the write cache extension portion to the tier-1 portion only after the amount of data stored via the predetermined access pattern exceeds a predetermined amount.

19. The method of claim 14 wherein assigning one of a plurality of frequency zones is based on a frequency of read requests from a host application.

20. The method of claim 14 wherein the storage array sequentially writes the random writes to a block of the write cache extension portion if the series of random writes is less than a RAID stripe size used by the tier-1 storage.

21. The method of claim 14 wherein the tier-1 storage comprises one or more hard disk drives (HDDs).

22. The method of claim 14 wherein the tier-0 storage comprises one or more solid state drives (SDDs).

23. The method of claim 14 additionally comprising:
migrating data between the tier-0, tier-1 and storage cache by measuring a frequency of access requests to the storage array, with the pages organized into frequency zones, such that pages belonging to a particular frequency zone are preferentially stored in one of the tier-0 portion, tier-1 portion, or main storage cache portion.

24. The method of claim 23 wherein the frequency zones further include at least hot frequency zone and a cold frequency zone, and the storage array controller further migrates hot pages to the tier-0 portion in exchange for relatively cold pages.

25. The method of claim 24 wherein the frequency zones further include a warm frequency zone, and in the absence of hot data, the storage array controller further migrates warm data to tier-0 in exchange for cold data.

26. A tangible, non-transitory, computer readable medium for storing computer executable instructions for providing a hybrid storage array function, with the computer executable instructions for:
receiving a storage command for access to a page of data of a storage array, the storage array having a tier-0 storage portion, a tier-1 storage portion, a storage cache main portion and a write cache extension portion, wherein a device access time of the tier-1 storage portion is slower than a device access time of the tier-1 portion, and where a device access time of the write cache extension portion is faster than the device access time of the tier-1 portion;
assigning one of a plurality of frequency zones of read and/or write requests to the page of data;
if the page is in a higher frequency zone, caching the data in the storage cache main portion;
if the page is in a middle frequency zone, migrate the page to the tier-0 storage portion;
determining if a storage command is one of a series of random writes to the tier-1 storage portion, and if so, sequentially write the series of random writes to a block of the write cache extension portion, and subsequently write the block to the tier-1 storage when the block has reached a particular size.

* * * * *